United States Patent
Stewart

(10) Patent No.: US 7,192,569 B2
(45) Date of Patent: Mar. 20, 2007

(54) HYDROGEN GENERATION WITH EFFICIENT BYPRODUCT RECYCLE

(75) Inventor: Albert E. Stewart, Sylmar, CA (US)

(73) Assignee: Pratt & Whitney, East Hartford, CT (US)

( * ) Notice: Subject to any disclaimer, the term of this patent is extended or adjusted under 35 U.S.C. 154(b) by 87 days.

(21) Appl. No.: 10/610,469

(22) Filed: Jun. 30, 2003

(65) Prior Publication Data

US 2004/0265227 A1    Dec. 30, 2004

(51) Int. Cl.
C01B 3/26    (2006.01)
B01J 7/00    (2006.01)

(52) U.S. Cl. ............... 423/652; 48/61; 423/653

(58) Field of Classification Search ........... 423/652, 423/653, 654
See application file for complete search history.

(56) References Cited

U.S. PATENT DOCUMENTS

| | | | | |
|---|---|---|---|---|
| 3,656,905 A | * | 4/1972 | Smith et al. | 423/653 |
| 6,103,143 A | * | 8/2000 | Sircar et al. | 252/373 |
| 6,312,658 B1 | * | 11/2001 | Hufton et al. | 423/418.2 |
| 6,315,973 B1 | * | 11/2001 | Nataraj et al. | 423/418.2 |
| 2002/0085967 A1 | * | 7/2002 | Yokota | 422/198 |
| 2003/0113257 A1 | * | 6/2003 | Kobayashi et al. | 423/652 |
| 2003/0150163 A1 | * | 8/2003 | Murata et al. | 48/197 R |

FOREIGN PATENT DOCUMENTS

| | | |
|---|---|---|
| EP | 1018485 | 7/2000 |
| JP | 2000143204 | 5/2000 |
| WO | WO 01/23302 | 4/2001 |
| WO | WO 02/085783 | 10/2002 |

OTHER PUBLICATIONS

Balasubramanian, et al., "Hydrogen From Methane in a Single-Step Process", Chemical Engineering Science, vol. 54, pp. 3543-3552, 1999, no date.

Kurdyumov, et al., "Steam Conversion of Methane in the Presence of a Carbon Dioxide Acceptor", Neftehimia, Moscow, RU, vol. 36, No. 2, pp. 139-143, 1996, no date.

Brun-Tsekhovoi, et al., "Thermodynamics of Methane Conversion in Presence of Carbon Dioxide Absorbent", Chemistry and Technology of Fuels and Oils, NY, vol. 12, No. 1/2, pp. 97-101, Feb. 1976.

* cited by examiner

Primary Examiner—Wayne A. Langel
(74) Attorney, Agent, or Firm—Black Lowe & Graham PLLC

(57) ABSTRACT

Methods and systems for generating hydrogen gas from methane are disclosed. In one embodiment, a method includes heating a vessel containing a catalyst to a temperature above approximately 600° centigrade and pressurizing the vessel to about ten atmospheres. A pressure swing absorbent, a methane stream, and a stream of steam are introduced into the vessel. In a particular aspect, the temperature may be maintained within a range of approximately 600 C. to approximately 700 C.

20 Claims, 5 Drawing Sheets

HYDROGEN GENERATION WITH EFFICIENT BYPRODUCT RECYCLE

RELATED APPLICATIONS

This application incorporates by this reference a co-pending, commonly-owned application by the same inventor entitled "Hydrogen Generation Apparatus and Method" filed on Oct. 15, 2002 with Ser. No. 10/271,406.

FIELD OF THE INVENTION

This invention relates generally to production of hydrogen molecules and, more specifically, to use of $CO_2$ adsorbents.

BACKGROUND OF THE INVENTION

Hydrogen is a very common atom occurring in many fuels, often in the presence of carbon in organic compounds. Generally, hydrogen may be used for upgrading petroleum feed stock to more useful products. In addition, hydrogen is used in many chemical reactions, such as reducing or synthesizing compounds. Particularly, hydrogen is used as a primary chemical reactant in the production of useful commercial products, such as cyclohexane, ammonia, and methanol.

Hydrogen itself is quickly becoming a fuel of choice because it reduces green house emissions. Particularly, hydrogen can drive a fuel cell to produce electricity or can be used to produce a substantially clean source of electricity for powering industrial machines, automobiles, and other internal combustion-driven devices. to produce a substantially clean source of electricity for powering industrial machines, automobiles, and other internal combustion-driven devices.

Hydrogen production systems include the recovery of bi-products from various industrial processes and the electrical decomposition of water. Presently the most economical means, however, is to remove the hydrogen from an existing organic compound. Several methods are known to remove or generate hydrogen from carbonations or hydrocarbon materials. Although many hydrocarbon molecules can be reformed to liberate hydrogen atoms, methane or natural gas is most commonly used.

Use of hydrocarbons as source materials has many inherent advantages. Hydrocarbon fuels are common enough to make production economical. Safe handling methods are well-developed to allow safe and expeditious transport of the hydrocarbons for use in the different reforming and generation techniques.

The main part of today's hydrogen production uses methane as a feedstock. Generally, steam methane reformers are used on the methane in large-scale industrial processes to liberate a stream of hydrogen. Steam methane reformers, however, generally produce less than 90% pure hydrogen molecules in their product streams. Along with the hydrogen streams, side products, such as carbon dioxide, methane, and other bi-products are also produced. The presence of the bi-products pollutes the hydrogen stream making it unusable without further purification.

The process of steam reformation of methane typically consists of reacting methane (from natural gas) with steam to produce CO and H2 (sometimes called synthesis gas). This reaction usually takes place over a nickel catalyst in a metal alloy tube at temperatures in the region of 800 to 1000 C. and at pressures of 30 to 60 atmospheres. The reaction is equilibrium limited and is highly endothermic requiring heat input of 60 Kcal/mol CH including the heat needed to produce steam from liquid water. Heating the outside of the reactor chamber containing the reactants provides the heat for the reaction. The chemical reaction for the reacting of methane is:

$$CH_4 + H_2O => CO + 3\ H_2 \tag{1}$$

The CO is to be removed from the product stream for a suitably pure hydrogen stream. To accomplish this, the product gases require further reaction. The appropriate further reaction is shifting the product gases with steam (usually called the water gas reaction) to form additional hydrogen and CO. The CO is then removed from the gas mixture by a pressure swing absorption process to produce a clean stream of hydrogen. The shift reaction produces a second portion of hydrogen by the reaction of the carbon monoxide, from the reforming reaction, with steam.

The shift reaction consumes the carbon monoxide from the reforming reaction to produce carbon dioxide and additional hydrogen gas. Water injection cools the hot gases from the steam reformer by producing steam in a phase-shift, hence the name shift reaction. The steam reacts with the CO forming additional hydrogen and $CO_2$. The reaction energy is substantially balanced so that little additional heat is required to keep the reaction going. The reaction produces a mixture of $CO_2$ and hydrogen with small amounts of CO. The shift reaction is a costly unit of production, requiring significant equipment and operating costs. The chemical equation for the shift reaction is:

$$CO + H_2O => CO_2 + H_2. \tag{2}$$

Finally, a pressure swing adsorption process, i.e. bi-product removal in an absorption process, generally follows steam reformation and shift reaction. Pressure swing absorbers (PSAs) can generally reduce the bi-products formed leaving a hydrogen product of about 99% pure hydrogen. To effectively remove the bi-products from the hydrogen stream, PSAs must selectively absorb and hold the carbon dioxide.

Generally, in a PSA process, the hydrogen stream is passed over a filter or bed. The particular PSA composition is selected to optimize carbon dioxide absorption at the temperatures, pressures, and composition of the shift reaction. The inclusion of the PSA or reaction cooperator, for example a calcium constituent, in the PSA bed produces a substantially pure hydrogen product, but it also increases the hydrogen generation from the fuel. According to Le Chatelier's Principle, removing a product of a reaction will shift the equilibrium of the reaction, thereby increasing the production of the other reaction products.

The separation reaction consumes carbon dioxide from the shift reaction to produce the solid calcium carbonate product. Because all of the other reactants are gases, the calcium carbonate, being a solid, is substantially removed from the reaction. The rate of absorption slows as the free calcium volume declines. The chemical equation for the PSA reaction is as follows:

$$CO2(g) + CaO(s) = CaCO3(s) \tag{3}$$

Shift reactors have been required to "scrub" the product stream of gas, because the conventional steam reforming reaction only produces about 75% of the potential hydrogen yield in the feedstock and leaves unshifted carbon monoxide in the product gas stream. Unshifted carbon monoxide and product carbon dioxide will generally be detrimental to most chemical reactions using the product hydrogen.

To remove carbon dioxide from the product stream, the use of PSAs is necessary. In conventional steam reformation of methane, a large carbon dioxide load in the product gas stream (nominally 20% by volume), prevents the hydrogen product from being useful in chemical reactions. In addition to being expensive, the purification process using PSAs results in loss of hydrogen product that must be rejected with the non-hydrogen stream that is produced. This hydrogen loss is typically in the range of 10 to 20% of the product hydrogen.

The conventional steam reformation of methane may also produce too many oxides of carbon in the product gas stream. Therefore, there exists an unmet need in the art for an improved method of generating hydrogen from methane wherein the product hydrogen is substantially uncontaminated with oxides of carbon, thereby requiring fewer costly steps to generate an appropriate product gas.

SUMMARY OF THE INVENTION

The present invention is directed to methods and systems for steam reforming of methane. Embodiments of the invention may advantageously improve or optimize the hydrogen produced in the product stream, and the methane produced in the by-product stream, by selectively heating the process. The improvement or optimization of hydrogen in the product stream and methane in the by-product stream, particularly in the presence of a pressure swing absorbent, may minimize the presence of gaseous oxides of carbon in the streams.

In one embodiment, a method includes heating a vessel containing a catalyst to a temperature of between 600° centigrade to 700° centigrade, and pressurizing the vessel to about ten atmospheres. A pressure swing absorbent, a methane stream, and a stream of steam are then introduced into the vessel. A resulting stream of product hydrogen, and a by-product stream of methane, may exhibit improved or optimized purity in comparison with the streams produced by conventional processes.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and systems for generating hydrogen using reforming catalysts together with $CO_2$ gas absorbents. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

By way of overview, methods and systems for generating hydrogen gas from methane are provided. In one embodiment, a method includes heating a vessel containing a catalyst to a temperature of between 600° centigrade to 700° centigrade, and pressurizing the vessel to about ten atmospheres. A pressure swing absorbent (PSA), a methane stream, and a stream of steam are introduced into the vessel. A resulting stream of product hydrogen, and a by-product stream of methane, may exhibit improved or optimized purity in comparison with the streams produced by conventional processes.

Figure 1:
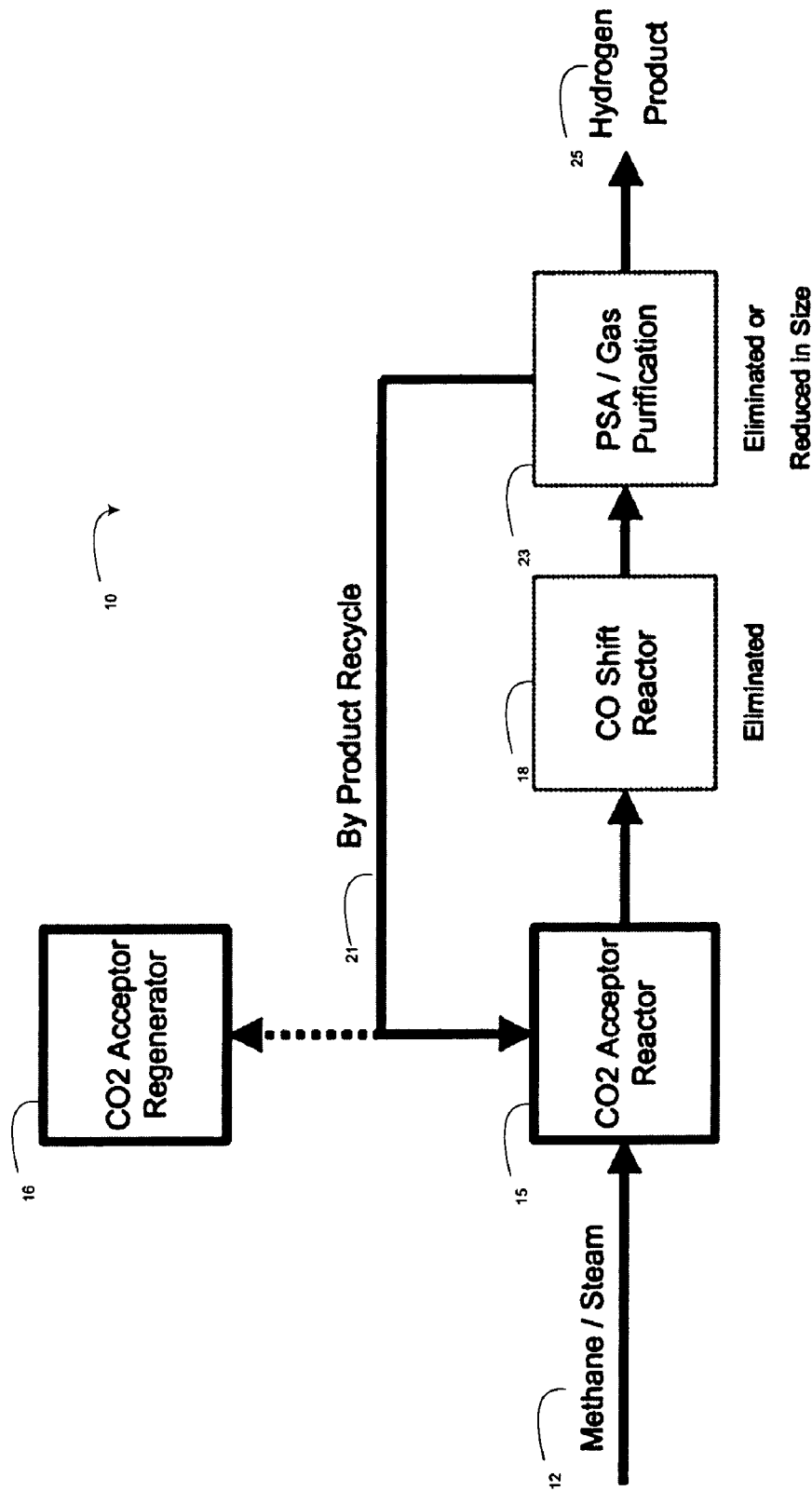
FIG. 1 is a block diagram of a method for steam reformation of methane in accordance with an embodiment of the present invention.

FIG. 1 is a block diagram 10 comparing an embodiment of a method in accordance with the present invention with a conventional process for steam reformation of methane. In both processes, a methane steam mix 12 is introduced into an on-line $CO_2$ acceptor reactor 15. As shown in FIG. 1, an off-line $CO_2$ acceptor reactor 16 is being regenerated by a calcining process that drives off carbonaceous products absorbed by a pressure swing absorbent present in both the on-line $CO_2$ acceptor reactor 15 and the off-line $CO_2$ acceptor reactor 16.

In the conventional process for steam reformation of methane, a product gas stream is then subjected to a CO shift reaction in a CO shift reactor 18. As indicated in FIG. 1, the inventive process may advantageously eliminate the need for the CO shift reactor 18. The product gas stream 25 may then be introduced into a PSA purifier 23 that removes oxides of carbon, principally carbon dioxide, by absorbing the carbon dioxide in a chemical reaction according to Equation (3) above. In the inventive process, however, the PSA purifier 23 can be either eliminated or greatly reduced because of the largely diminished presence of oxides of carbon in the product gas stream 25.

In the inventive process, improving or optimizing a methane fraction in the by-product stream may largely reduce or eliminate the oxides of carbon. Because the utility of the by-product stream is a function of a presence of oxides of carbon, the by-product stream 21 may be recycled via a return line, and may be useful for either returning to the reactor vessel 15 as feedstock, or as a fuel supply for firing the reactor vessel 15, providing the heat for the steam reformation of methane reaction.

Figure 2:
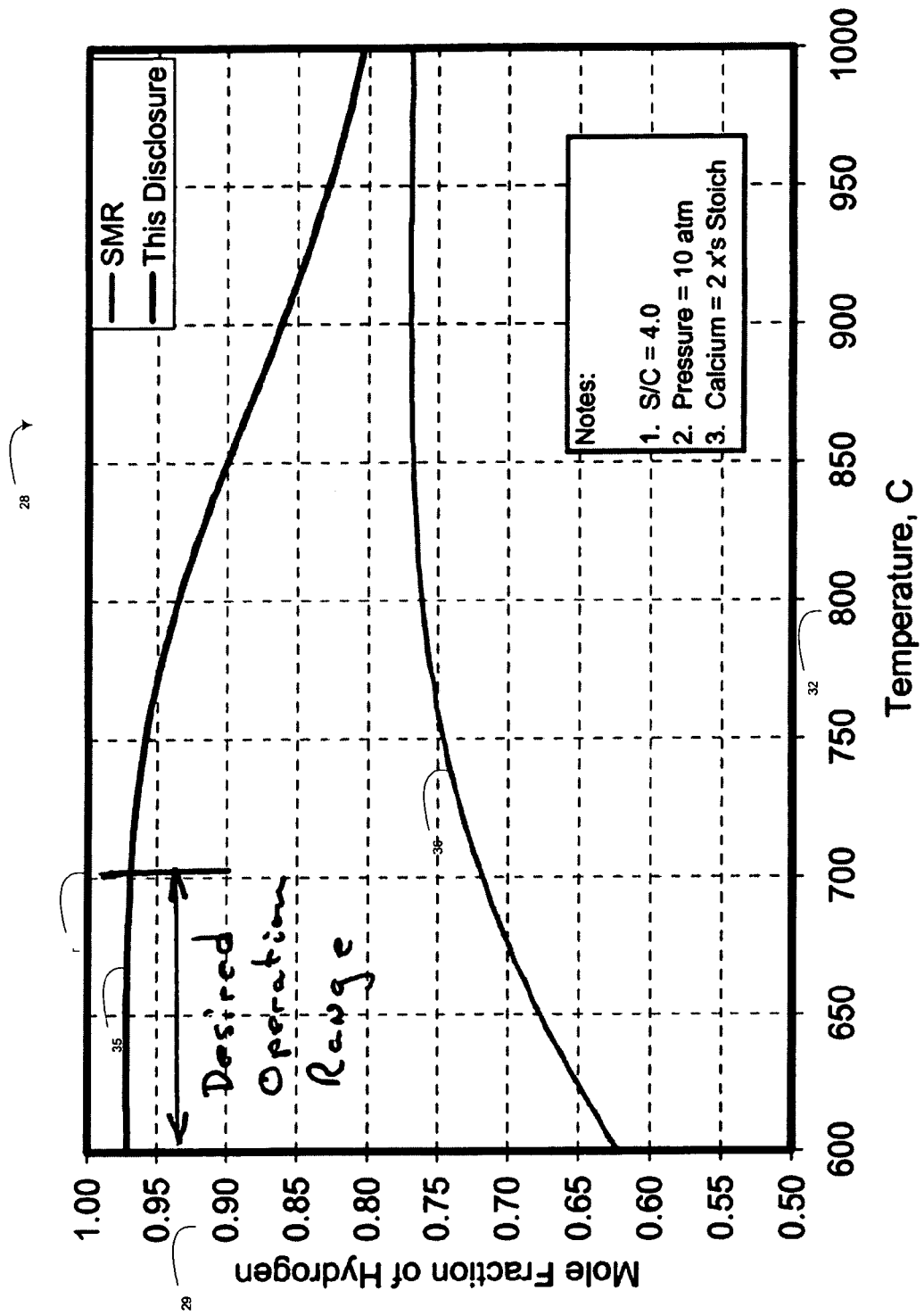
FIG. 2 is a chart depicting a relationship between hydrogen in a product stream expressed in volume as a function of a temperature of the steam reformation of methane.

FIG. 2 is a chart depicting a relationship between hydrogen in a product stream expressed in volume as a function of the temperature of the steam reformation of methane. In one embodiment, each reaction is conducted at approximately ten atmospheres, and when introduced, the PSA may be calcium (or a calcium compound) at twice the stoichiometric ratio. The chart shown in FIG. 2 graphs hydrogen gas concentration (dry basis) as a function of temperature 28. The x-axis is a centigrade scale 32 shown plotted against a mole fraction of hydrogen scale 29. Two functions are plotted: the mole fraction of hydrogen in the conventional steam reformation of methane 36 and the mole fraction of hydrogen in the process for steam reformation of methane in accordance with an embodiment of the present invention 35. It may be noted that the mole fraction of hydrogen in the conventional steam reformation of methane 36 is a distinct curve below that of the mole fraction of hydrogen in the inventive steam reformation of methane 35 throughout the measured range.

Referring to FIGS. 1 and 2, at least two factors may produce the observable distinction depicted between the inventive process and the conventional process for steam reformation of methane 35, 36. First, in the process according to an embodiment of the present invention, the presence of PSAs in the on-line $CO_2$ acceptor reactor 15 may advantageously absorb a product of a reaction, namely $CO_2$. By removing the $CO_2$ from the gases contained in the $CO_2$ acceptor reactor 15 as well as the product, the reaction described in Equation 1 can continue without the presence of the products to isolate the reactants, in the methane steam mix 12, one from another.

The second factor may be attributable to the selection of the temperature of the process 10. For example, the mole fraction of hydrogen in a particular embodiment of a method for steam reformation of methane 35 may be most productive in a range r from approximately 600° centigrade to approximately 700° centigrade. This range r is notable because, in the absence of $CO_2$, the reaction may proceed to maximize the mole fraction of the hydrogen produced.

Figure 3:
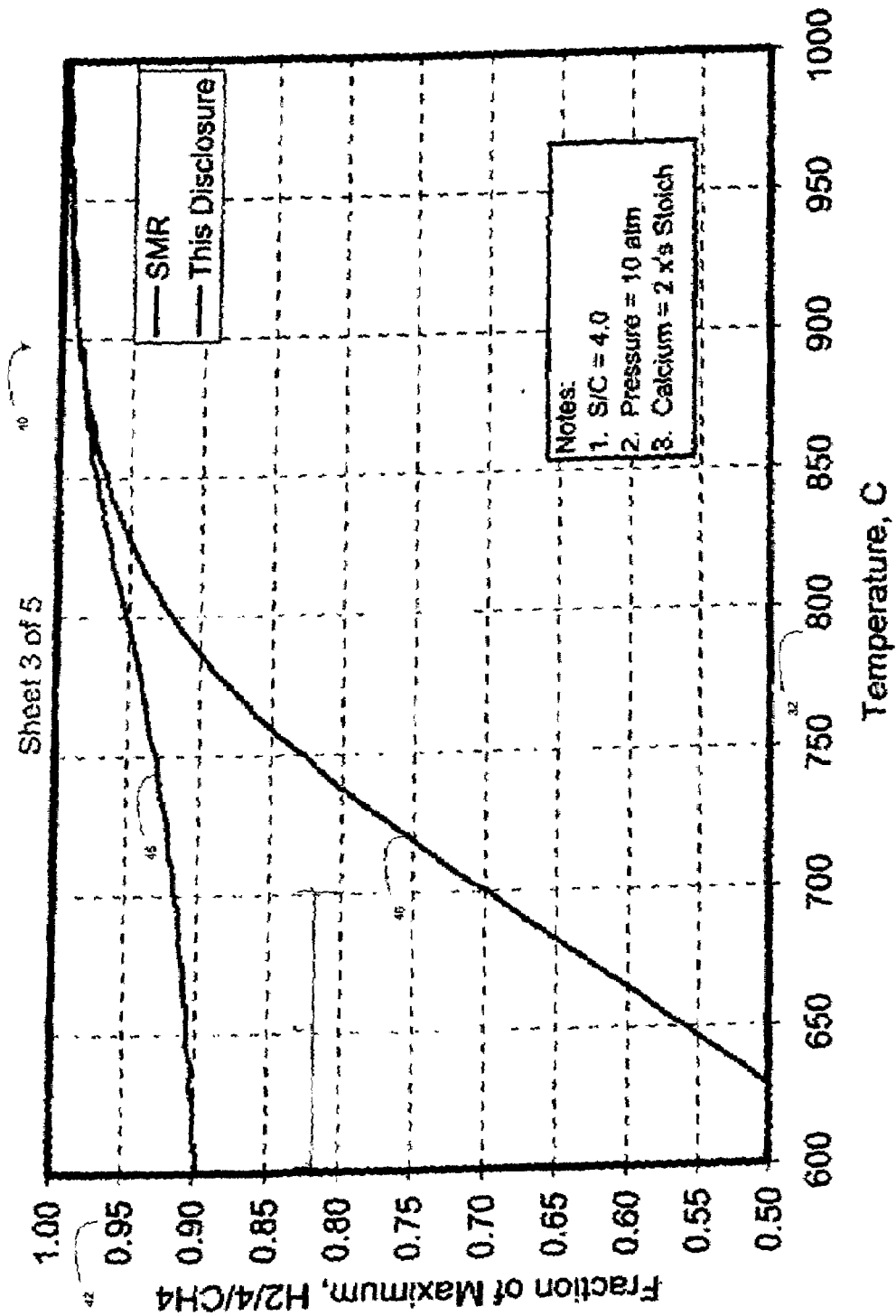
FIG. 3 is a chart depicting a relationship between hydrogen in the product stream expressed as a fraction of input feedstock and as a function of temperature of the steam reformation of methane.

FIG. 3 is a chart depicting a relationship between hydrogen in the product stream expressed as a fraction of input feedstock and as a function of temperature of the steam reformation of methane. Again, the results of a conventional process 46 and a process in accordance with an embodiment of the present invention 45 may be conducted at approximately ten atmospheres, and when introduced, the PSA may be calcium at twice the stoichiometric ratio. The chart shown in FIG. 3 shows a graph of hydrogen fraction as a function of temperature 28. The x-axis is the centigrade scale 32 shown plotted against a mole fraction of hydrogen in the product gas scale 42. Two functions are plotted: the mole fraction of hydrogen in the conventional steam reformation of methane 46 and the mole fraction of hydrogen in the method for steam reformation of methane in accordance with an embodiment of the present invention 45. Again, the mole fraction of hydrogen in the conventional steam reformation of methane 46 is a distinct curve below that of the mole fraction of hydrogen in the inventive steam reformation of methane 45 throughout the measured range.

As further shown in FIG. 3, in this embodiment, the mole fraction of hydrogen in the inventive steam reformation of methane 45 varies between 90% and approaching 100% throughout the measured range. While the mole fraction of hydrogen in the inventive steam reformation of methane 45 is at its lowest within the range r, that low range is still suitable for production of hydrogen. Notably, at the lower temperatures, the output of hydrogen is not significantly degraded as it is in the mole fraction of hydrogen in the conventional steam reformation of methane 46 at the same temperatures. Thus, embodiments of methods in accordance with the present invention may be operated at reduced temperatures in comparison with prior art methods.

Figure 4:
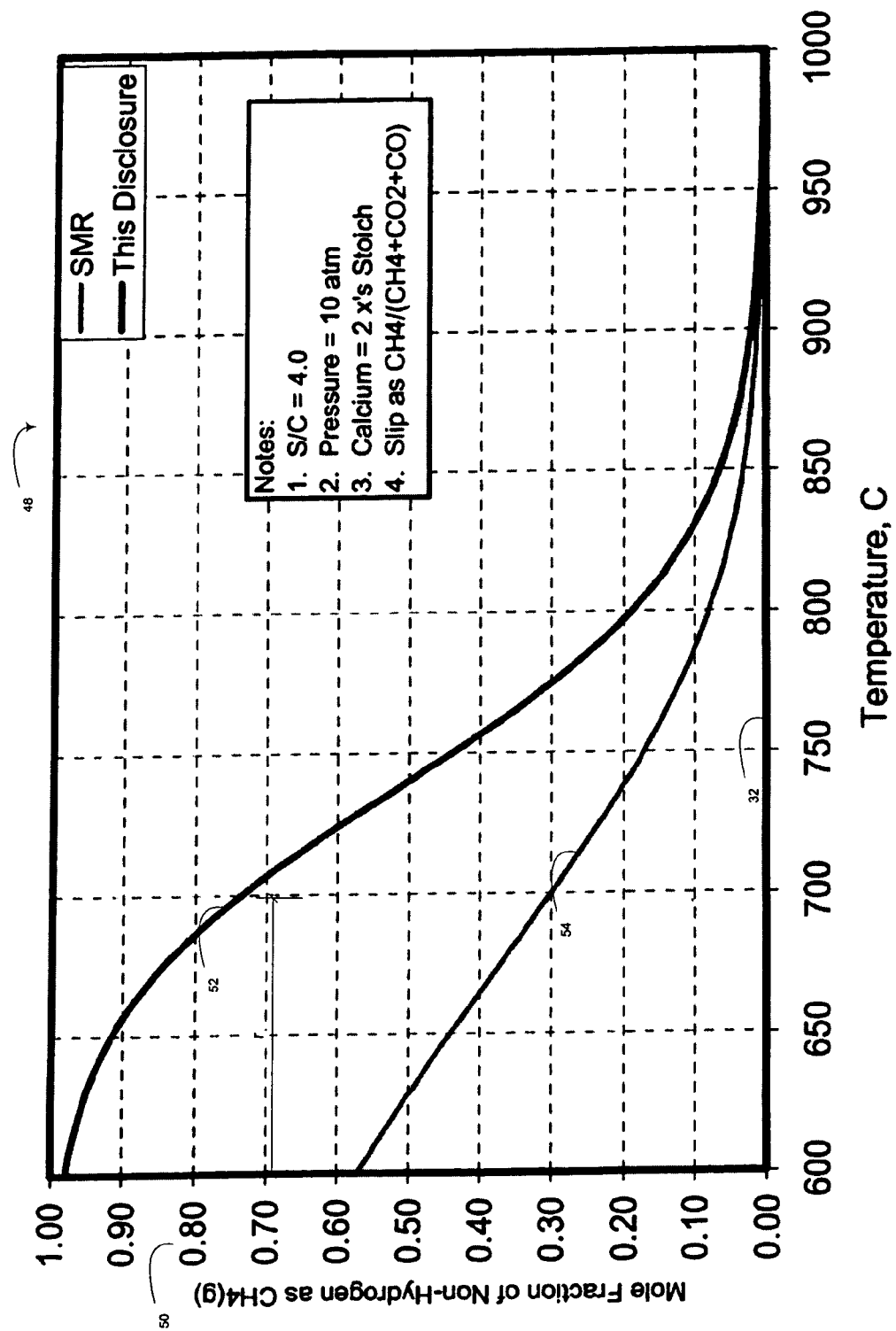
FIG. 4 is a chart depicting a relationship between methane expressed as a fraction of the gases in a by-product stream as a function of the temperature of the steam reformation of methane.

FIG. 4 is a chart depicting a relationship between methane expressed as a fraction of the gases in a by-product stream as a function of the temperature of the steam reformation of methane. Again, both the conventional process results 54 and the inventive process results 52 may be produced by reactions conducted at approximately ten atmospheres and when introduced, the PSA may be calcium at twice the stoichiometric ratio. The chart is a graph of the hydrogen gas concentration (dry basis) as a function of temperature 28. The x-axis is a centigrade scale 32 shown plotted against a mole fraction of methane scale 50. Two functions are plotted: the mole fraction of methane in the conventional steam reformation of methane 54 and the mole fraction of methane in the inventive steam reformation of methane 52. Similar to the results shown in FIGS. 2 and 3, the mole fraction of methane in the conventional steam reformation of methane 54 is a distinct curve below that of the mole fraction of methane in the inventive steam reformation of methane 52 throughout the measured range.

At the upper end of the range r, at a temperature of approximately 700° centigrade, the mole fraction of methane in the inventive steam reformation of methane 52 drops off at a precipitous rate. Thus, for the mole fraction of methane in the inventive steam reformation of methane 52, the presence of carbon dioxide in the reactor vessel 15 is deemed low enough not to hinder the steam reformation reaction.

Figure 5:
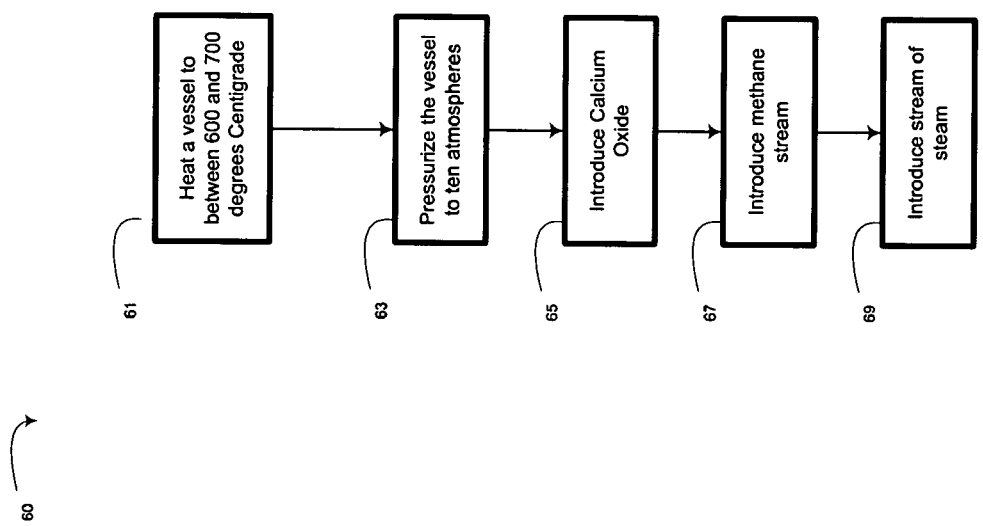
FIG. 5 is a flowchart of a process for temperature controlled steam reformation of methane in accordance with an embodiment of the present invention.

FIG. 5 is a flowchart of a process for temperature controlled steam reformation of methane 60 in accordance with an embodiment of the present invention. In this embodiment, at a block 61, the on-line $CO_2$ acceptor reactor 15 (FIG. 1) is heated and maintained at between 600° centigrade and 700° centigrade. A catalyst (e.g. a nickel-based catalyst) may be present, and may drop the energy threshold necessary to steam reform methane. At a block 63, the acceptor reactor vessel 15 may be pressurized to approximately ten atmospheres.

With continued reference to FIG. 5, a PSA may be introduced at a block 65. While there is no need for the PSA to precede either the heating or the pressurization, in alternate embodiments, the PSA may be introduced prior to the heating and pressurization (blocks 61 and 63, respectively). In one presently preferred embodiment, the vessel 15 may be provided with the PSA absorbent in place. While such is the presently preferred method for generating hydrogen in on-line $CO_2$ acceptor reactor 15, it is also possible to introduce the PSA in a feedstock of methane introduced into the on-line $CO_2$ acceptor reactor 15 (FIG. 1). Either method will advantageously provide absorbtion of the $CO_2$ since the PSA will be present at the steam reformation of methane reaction to improve or otherwise shift the equilibrium of the reaction.

At a block 67, the methane may be introduced into the vessel 15, and at a block 69, the steam may be presented, allowing the steam to reform the methane, producing hydrogen and $CO_2$. The $CO_2$ may be readily absorbed by the PSA present, yielding a hydrogen product stream of improved or optimized purity, and a methane by-product stream of improved or optimized purity. Such gas streams may each be industrially valuable.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for generating hydrogen gas from a methane, the method comprising:
   heating a vessel containing a catalyst to a temperature within a range of approximately 600° centigrade to approximately 700° centigrade;
   pressurizing the vessel to about ten atmospheres;

introducing a pressure swing absorbent into the vessel;
introducing a methane stream into the heated and pressurized vessel containing the absorbent; and
introducing a stream of steam into the heated and pressurized vessel containing the absorbent.

2. The method of claim 1, wherein the pressure swing absorbent includes calcium oxide.

3. The method of claim 2, wherein the calcium oxide is introduced at twice a stoichiometric ratio.

4. The method of claim 1, wherein the steam is introduced in a steam to carbon ratio of about four.

5. The method of claim 1, further including venting a product gas from the vessel.

6. The method of claim 5, wherein the product gas is substantially hydrogen.

7. The method of claim 1, further including venting a by-product gas from the vessel.

8. The method of claim 7, wherein the by-product gas is substantially methane.

9. The method of claim 7, wherein the by-product gas is recycled as a feedstock.

10. The method of claim 7, wherein the by-product gas is recycled as a fuel for heating the vessel.

11. A method for steam reformation of methane, the method comprising:
introducing a pressure swing absorbent into a vessel, the vessel being configured to steam reform the hydrocarbon gas;
maintaining a pressure within the vessel, the pressure being about ten atmospheres; and
maintaining a temperature within the vessel, the temperature being within a range of approximately 600° centigrade to approximately 700° centigrade;
introducing a methane stream into the heated and pressurized vessel containing the absorbent; and
introducing a stream of steam into the heated and pressurized vessel containing the absorbent.

12. The method of claim 11, wherein the pressure swing absorbent includes calcium oxide.

13. The method of claim 11, wherein the calcium oxide is introduced at twice a stoichiometric ratio.

14. The method of claim 11, wherein the steam is introduced in a steam to carbon ratio of about four.

15. The method of claim 11, further including venting a product gas from the vessel.

16. The method of claim 15, wherein the product gas is substantially hydrogen.

17. The method of claim 15, further including venting a by-product gas from the vessel.

18. The method of claim 17, wherein the by-product gas is substantially methane.

19. The method of claim 17, wherein the by-product gas is recycled as a feedstock.

20. The method of claim 17, wherein the by-product gas is recycled as a fuel for heating the vessel.

* * * * *